United States Patent
Iyer et al.

(10) Patent No.: US 12,376,138 B2
(45) Date of Patent: *Jul. 29, 2025

(54) SYSTEM AND METHOD OF PROVIDING AN ADAPTIVE MODULATION AND CODING SCHEME

(71) Applicant: Space Exploration Technologies Corp., Hawthorne, CA (US)

(72) Inventors: Jayasuryan V. Iyer, Redmond, WA (US); Yashodhan Dandekar, Cupertino, CA (US); Khasim Shaheed Shaik Mahammad, Milpitas, CA (US); Ramakrishna Akella, San Diego, CA (US); Chen Chen, Irvine, CA (US); Phillip E. Barber, Sammamish, WA (US); Peter J. Worters, San Carlos, CA (US)

(73) Assignee: Space Exploration Technologies Corp., Hawthorne, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/486,035

(22) Filed: Oct. 12, 2023

(65) Prior Publication Data

US 2024/0040601 A1 Feb. 1, 2024

Related U.S. Application Data

(63) Continuation of application No. 17/338,518, filed on Jun. 3, 2021, now Pat. No. 11,792,832.
(Continued)

(51) Int. Cl.
*H04W 72/54* (2023.01)
*H04B 17/336* (2015.01)
(Continued)

(52) U.S. Cl.
CPC ........ *H04W 72/54* (2023.01); *H04B 17/336* (2015.01); *H04B 17/382* (2015.01);
(Continued)

(58) Field of Classification Search
CPC ............... H04B 17/336; H04B 17/382; H04B 7/18543; H04L 1/0003; H04L 1/0009;
(Continued)

(56) References Cited

U.S. PATENT DOCUMENTS 11,031,999 B1  6/2021 Liu et al.
11,800,552 B1 * 10/2023 Iyer .................... H04B 7/1851
(Continued)

*Primary Examiner* — Phuc H Tran
(74) *Attorney, Agent, or Firm* — Polsinelli PC

(57) ABSTRACT

A method for downlink link adaptation includes receiving, from a satellite and at a user terminal, a first data packet data unit according to a first downlink modulation and coding scheme (MCS), computing error vector magnitude data associated with the first data packet data unit, generating, based on one or more of the error vector magnitude data, user terminal signal-to-noise-ratio feedback based on a constant times a previous user terminal signal-to-noise-ratio and a current user terminal signal-to-noise-ratio, and transmitting an uplink packet data unit having a downlink block error rate and the user terminal signal-to-noise-ratio feedback. A satellite runs a link adaptation algorithm based on the user terminal signal-to-noise-ratio feedback and block error rate to generate a second downlink MCS. The method includes receiving at the user terminal a second data packet data unit according to the second downlink MCS for the satellite-to-user-terminal downlink. Uplink link adaptation is also disclosed.

20 Claims, 9 Drawing Sheets

Related U.S. Application Data

(60) Provisional application No. 63/035,246, filed on Jun. 5, 2020.

(51) Int. Cl.
*H04B 17/382* (2015.01)
*H04L 1/00* (2006.01)
*H04W 72/21* (2023.01)

(52) U.S. Cl.
CPC .......... *H04L 1/0003* (2013.01); *H04L 1/0009* (2013.01); *H04W 72/21* (2023.01)

(58) Field of Classification Search
CPC .. H04L 1/203; H04W 72/1268; H04W 72/21; H04W 72/54
See application file for complete search history.

(56) References Cited

U.S. PATENT DOCUMENTS

| | | | |
|---|---|---|---|
| 12,021,609 B2* | 6/2024 | Parkvall | H04L 5/1469 |
| 2009/0323602 A1* | 12/2009 | Li | H04W 8/04 |
| | | | 370/329 |
| 2017/0238216 A1* | 8/2017 | Damnjanovic | H04W 36/30 |
| | | | 455/427 |
| 2020/0236582 A1 | 7/2020 | Chin et al. | |
| 2021/0075501 A1* | 3/2021 | Xu | H04B 7/1853 |

* cited by examiner

| MCS NUMERIC INDEX | MCS | RATE | CODED BITS (N) | FEC CODE RATE | CODED BITS PER SYMBOL | INFO BITS PER SYMBOL | SNR THRESHOLD ($10^{-6}$ EsNo) | INFO SYMBOLS | CODED SYMBOLS | CODED TOTAL INFO BITS (K) |
|---|---|---|---|---|---|---|---|---|---|---|
| 0 | BCC-BPSK | 1/3 | 114 | 0.3333 | 1 | 0.3333 | 0.00 | 32 | 114 | 32 |
| 1 | BPSK | 1/4 | 512 | 0.2500 | 1 | 0.2500 | -1.39 | 128 | 512 | 128 |
| 2 | BPSK | 1/2 | 16384 | 0.5000 | 1 | 0.5000 | -1.30 | 8192 | 16384 | 8192 |
| 10 | QPSK | 1/2 | 16384 | 0.5000 | 2 | 1.0000 | 1.70 | 4096 | 8192 | 8192 |
| 11 | BPSK | 1/2 | 512 | 0.5000 | 1 | 0.5000 | 1.90 | 256 | 512 | 256 |
| 12 | QPSK | 1/2 | 8192 | 0.5000 | 2 | 1.0000 | 2.00 | 2048 | 4096 | 4096 |
| 27 | 8PSK | 1/2 | 8192 | 0.5000 | 3 | 1.5000 | 4.80 | 1366 | 2731 | 4096 |
| 28 | 8PSK | 35/64 | 16384 | 0.5469 | 3 | 1.6406 | 4.90 | 2988 | 5462 | 8960 |
| 29 | QPSK | 11/16 | 2048 | 0.6875 | 2 | 1.3750 | 5.10 | 704 | 1024 | 1408 |
| 30 | QPSK | 1/2 | 512 | 0.5000 | 2 | 1.0000 | 5.20 | 128 | 256 | 256 |
| 39 | 16QAM | 1/2 | 16384 | 0.5000 | 4 | 2.0000 | 6.50 | 2048 | 4096 | 8192 |
| 40 | QPSK | 5/8 | 576 | 0.6250 | 2 | 1.2500 | 6.80 | 180 | 288 | 360 |
| 41 | 16QAM | 1/2 | 8192 | 0.5000 | 4 | 2.0000 | 6.80 | 1024 | 2048 | 4096 |
| 56 | 16QAM | 21/32 | 16384 | 0.6563 | 4 | 2.6250 | 9.30 | 2688 | 4096 | 10752 |
| 57 | 16QAM | 21/32 | 8192 | 0.6563 | 4 | 2.6250 | 9.60 | 1344 | 2048 | 5376 |
| 71 | 32QAM | 21/32 | 16384 | 0.6563 | 5 | 3.2813 | 11.40 | 2151 | 3277 | 10752 |
| 72 | 16QAM | 25/32 | 8192 | 0.7813 | 4 | 3.1250 | 11.60 | 1600 | 2048 | 6400 |
| 125 | 64QAM | 53/64 | 2048 | 0.8281 | 6 | 4.9688 | 18.60 | 284 | 342 | 1696 |
| 126 | 64QAM | 7/8 | 16384 | 0.8750 | 6 | 5.2500 | 18.60 | 2390 | 2731 | 14336 |

FIG. 4

SYSTEM AND METHOD OF PROVIDING AN ADAPTIVE MODULATION AND CODING SCHEME

PRIORITY CLAIM

The present application is a continuation patent application that claims priority to U.S. patent application Ser. No. 17/338,518, filed on Jun. 3, 2021, entitled "SYSTEM AND METHOD OF PROVIDING AN ADAPTIVE MODULATION AND CODING SCHEME", which claims priority to U.S. Provisional Application No. 63/035,246, filed Jun. 5, 2020, entitled "SYSTEM AND METHOD OF PROVIDING AN ADAPTIVE MODULATION AND CODING SCHEME", the contents of which are hereby incorporated herein by reference in their entirety and for all purposes.

TECHNICAL FIELD

The present disclosure introduces a concept of providing a dynamically changing modulation and coding scheme for communication between a satellite and a user terminal or a gateway.

BACKGROUND

Link adaptation, or adaptive coding and modulation (ACM), is a term used in wireless communications for terrestrial communications to denote the matching of the modulation, coding and other signal and protocol parameters to the conditions on the radio link. Terrestrial communications refer typically to cellular protocols between a cell phone and a base station. The pathloss, the interference due to signals coming from other transmitters, the sensitivity of the receiver, or the available transmitter power margin, can all be used to adapt the modulation and coding scheme (MCS). For example, the WiMAX standard uses a rate adaptation algorithm that adapts the MCS according to the quality of the radio channel, and thus the bit rate and robustness of data transmission. The process of link adaptation is a dynamic one and the signal and protocol parameters change as the radio link conditions change.

Adaptive modulation systems invariably require some channel state information at the transmitter. Alternatively, the channel knowledge can also be directly measured at the receiver and fed back to the transmitter. Adaptive modulation systems improve the rate of transmission, and/or bit error rates, by exploiting the channel state information that is present at the transmitter.

In ACM processes, the MCS for each terminal is adaptively tuned over time to meet the current requirements of the terminal. As channel conditions change, such as a fade variance during a rainy and then nonrainy period, the MCS is adjusted accordingly to compensate. Terminals in the same beam are likely to use different MCSs during a weather event because the fade conditions are very localized and vary greatly even within the footprint of one beam. The adaptation is targeted to give each terminal the highest possible data rate that the link will support at those individual terminals, while preserving some operating margin to accommodate short-term fluctuations. In this way, ACM overcomes the limitation of variable coding and modulation.

BRIEF DESCRIPTION OF THE DRAWINGS

In order to describe the manner in which the various advantages and features of the disclosure can be obtained, a more particular description of the principles described above will be rendered by reference to specific embodiments thereof, which are illustrated in the appended drawings. Understanding that these drawings depict only example embodiments of the disclosure and are not to be considered to limit its scope, the principles herein are described and explained with additional specificity and detail through the use of the drawings in which:

FIG. 4 illustrates an example table of values associated with the modulation and coding schemes which can be chosen for a given communication;

DETAILED DESCRIPTION

Figure 1:
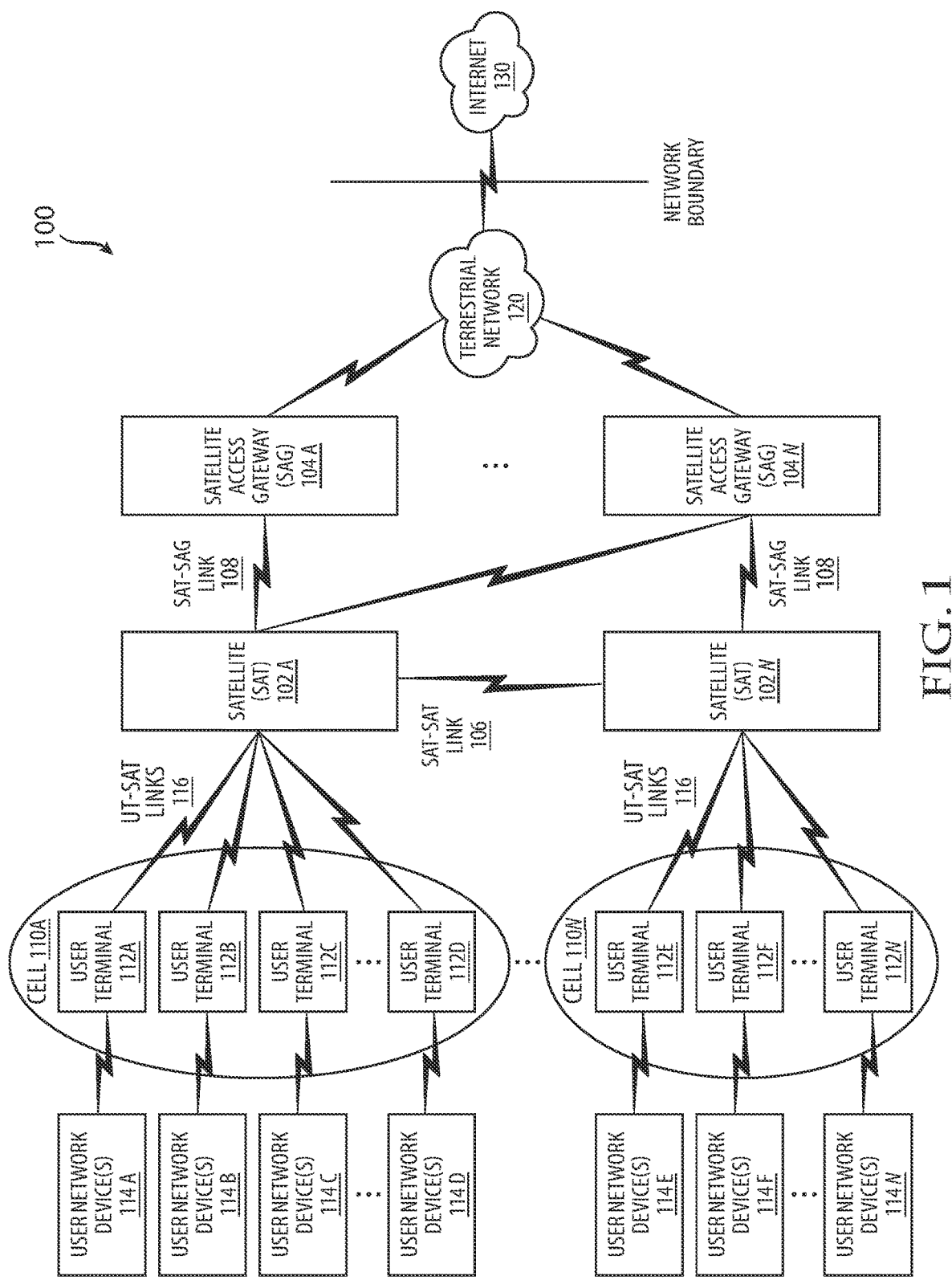
FIG. 1 is a simplified block diagram illustrating an example wireless communication system, in accordance with some examples of the present disclosure.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

Overview

Disclosed are various approaches to providing uplink and downlink modulation and coding scheme adaption for satellite communications. The current ACM protocols apply only to terrestrial communications. Protocols for satellite-to-user-terminal and satellite-to-gateway communications traditionally use a configurable MCS that is fixed. The issues that arise in satellite communication differ from terrestrial wireless communication such as cellular services. New techniques are needed with respect to satellite communication link adaptation to address the unique needs given the distances involved. This disclosure introduces a number of different link adaptation protocols for satellite-to-user-terminal communications as well as satellite-to-gateway communications. These contexts are different, and the protocols differ as well depending on whether the communication from the satellite is with a user terminal or a gateway. In some cases, methods can include performing both uplink and downlink link adaptation. In other aspects, a method can include just performing downlink link adaptation or uplink link adaptation. In one aspect, this disclosure focuses on the satellite-to-user-terminal link and provides a dynamically adapting MCS in which both the uplink and downlink adaptable MCS is determined on the satellite and used by the satellite for downlink communications and reported to the user terminal for use in uplink communications.

The goal of this adaptable MCS is to be able to place or encode the most number of bits in the given number of symbols for data communication. The receiving device (such as a user terminal) transmits signal-to-noise-ratio (SNR) data regarding the link quality (such as the link quality associated with the downlink from the satellite to the user terminal) to the sending device, and the sending device will adaptively set the MCS for transmission of data based on the SNR feedback. The device which runs the link adaptation protocol can vary between the satellite and a ground-based device depending on which algorithm is applied. For example, for a satellite-to-user-terminal communication, the satellite generates both an updated uplink MCS and a downlink MCS. The satellite uses the downlink MCS for its transmission and transmits the uplink MCS to the user terminal for its uplink transmissions. For satellite-to-gateway communications, the satellite generates and uses the downlink MCS and the gateway generates and uses an updated uplink MCS. The following examples focus on the satellite-to-user-terminal embodiments of this disclosure.

In a first aspect, a method includes transmitting, from a satellite, a first uplink map grant to a user terminal and a first uplink MCS for the user terminal, the first uplink map grant identifying which parts of a frame the user terminal is granted for transmitting user terminal data on an uplink channel to the satellite. The method includes transmitting, from the satellite and to the user terminal, a first data packet data unit according to a first downlink MCS for the satellite-to-user-terminal downlink, receiving, at the satellite and from the user terminal, an uplink packet data unit having a downlink block error rate and a downlink signal-to-noise-ratio generated by the user terminal and parsing, at the satellite, physical channel information from the uplink packet data unit.

The method can include extracting, at the satellite and based on the physical channel information, error vector magnitude data to generate an uplink signal-to-noise-ratio, generating a new uplink signal-to-noise-ratio based on a combination of a previous uplink signal-to-noise-ratio times a constant and the uplink signal-to-noise-ratio and generating, by the satellite, a second uplink modulation and coding scheme (MCS) for the user terminal and a second downlink modulation and coding scheme for the satellite-to-user-terminal downlink based on one or more of the downlink block error rate, the downlink signal-to-noise-ratio, and the new uplink signal-to-noise-ratio.

The above example method provides for both uplink and downlink adaptation evaluated on the satellite.

The method can further include transmitting, from the satellite, a second uplink map grant to the user terminal and the second uplink MCS for the user terminal and transmitting, from the satellite and to the user terminal, a data packet data unit according to the second downlink MCS for the satellite-to-user-terminal downlink.

In another aspect, the method can focus on the downlink link adaptation approach. In this case, the user terminal generates signal-to-noise feedback to send to the satellite. A method of performing downlink link adaptation includes receiving, from a satellite and at a user terminal, a first data packet data unit according to a first downlink MCS for the satellite-to-user-terminal downlink, computing, at the user terminal, an error vector magnitude data associated with the first data packet data unit, generating, based on the error vector magnitude data, user terminal signal-to-noise-ratio feedback based on a constant times a previous user terminal signal-to-noise-ratio and a current user terminal signal-to-noise-ratio, and transmitting, to the satellite and from the user terminal, an uplink packet data unit having a downlink block error rate and the user terminal signal-to-noise-ratio feedback. The satellite can run a link adaptation algorithm based on the user terminal signal-to-noise-ratio feedback and downlink block error rate to generate a second downlink MCS for the satellite-to-user-terminal downlink. The method further can include receiving a second data packet data unit according to the second downlink MCS for the satellite-to-user-terminal downlink.

In another aspect, the method can relate to uplink link adaptation in which the satellite performs a new signal-to-noise calculation and the satellite requires feedback from the satellite receive components about the user terminal uplink channel quality. A method of performing uplink link adaptation includes transmitting, from a satellite, a first uplink map grant to a user terminal and a first uplink MCS for the user terminal, the first uplink map grant identifying which parts of a frame the user terminal is granted for transmitting user terminal data on an uplink channel to the satellite, receiving, at the satellite and from the user terminal, an uplink packet data unit having a downlink block error rate and a downlink signal-to-noise-ratio generated by the user terminal and parsing, at the satellite, physical channel information from the uplink packet data unit.

The method can include extracting, at the satellite and based on the physical channel information, error vector magnitude data, generating a new uplink signal-to-noise-ratio based on a combination of a previous uplink signal-to-noise-ratio times a constant and a current uplink signal-to-noise-ratio based on the error vector magnitude data and generating, via the downlink and uplink adaptation algorithm, a second uplink MCS for the user terminal based on one or more of the downlink block error rate, the downlink signal-to-noise-ratio and the new uplink signal-to-noise-ratio. The satellite can then transmit a second uplink map grant and the second uplink MCS to the user terminal for use by the user terminal.

DETAILED DESCRIPTION

This disclosure introduces an uplink and downlink link adaptation algorithm which changes the modulation and coding scheme (MCS) for one or more of the uplink or the downlink based on link conditions and/or other factors. The technology described herein can apply to a user terminal communicating with a satellite. This disclosure also discusses some concepts for link adaptation for the satellite-to-gateway link.

Wireless communication systems can use OFDMA (Orthogonal Frequency Division Multiple Access) to split a radio signal or channel into multiple sub-signals to allow the wireless communication system to receive multiple signals from different devices within a single radio frame or channel. For example, multiple devices can be assigned non-overlapping sets of contiguous time and frequency subcarriers (e.g., resource elements) that devices can use to transmit digital signals simultaneously without interference. However, since the digital signals are orthogonal, OFDMA schemes are generally sensitive to Doppler shift and frequency and time synchronization problems.

Disclosed herein are systems, methods, and computer-readable media for multi-user uplink and downlink link adaptation with respect to the MCS for uplink or downlink transmission of data. The disclosed technologies can provide a better match of the MCS for uplink or downlink communications given data such as link conditions and/or other factors.

Figure 2:
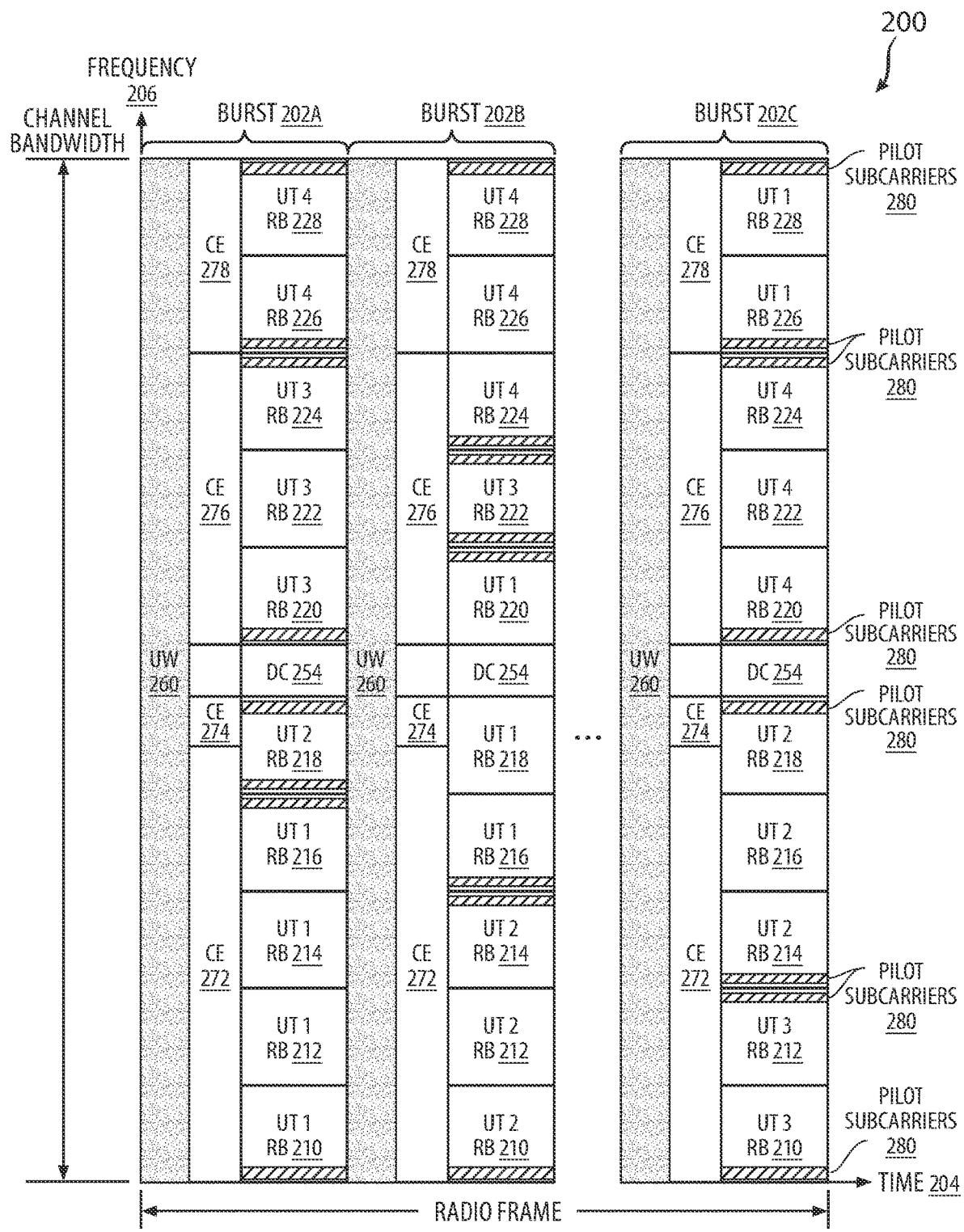
FIG. 2 illustrates a frame structure with different user data positioned in different locations with the frame.
Figure 3:
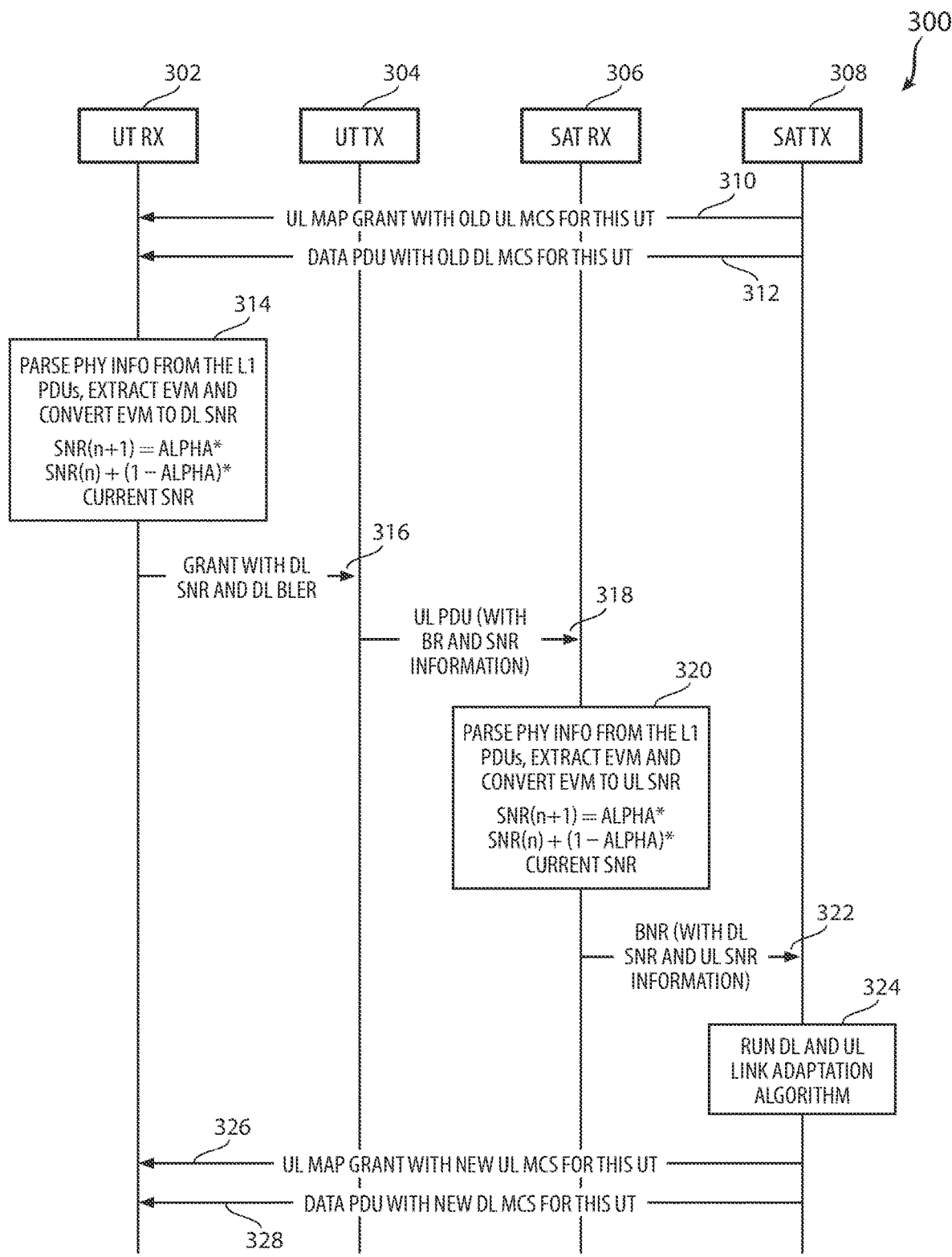
FIG. 3 is a diagram illustrating a signal flow between a satellite and a user terminal with respect to link adaptation.
Figure 5:
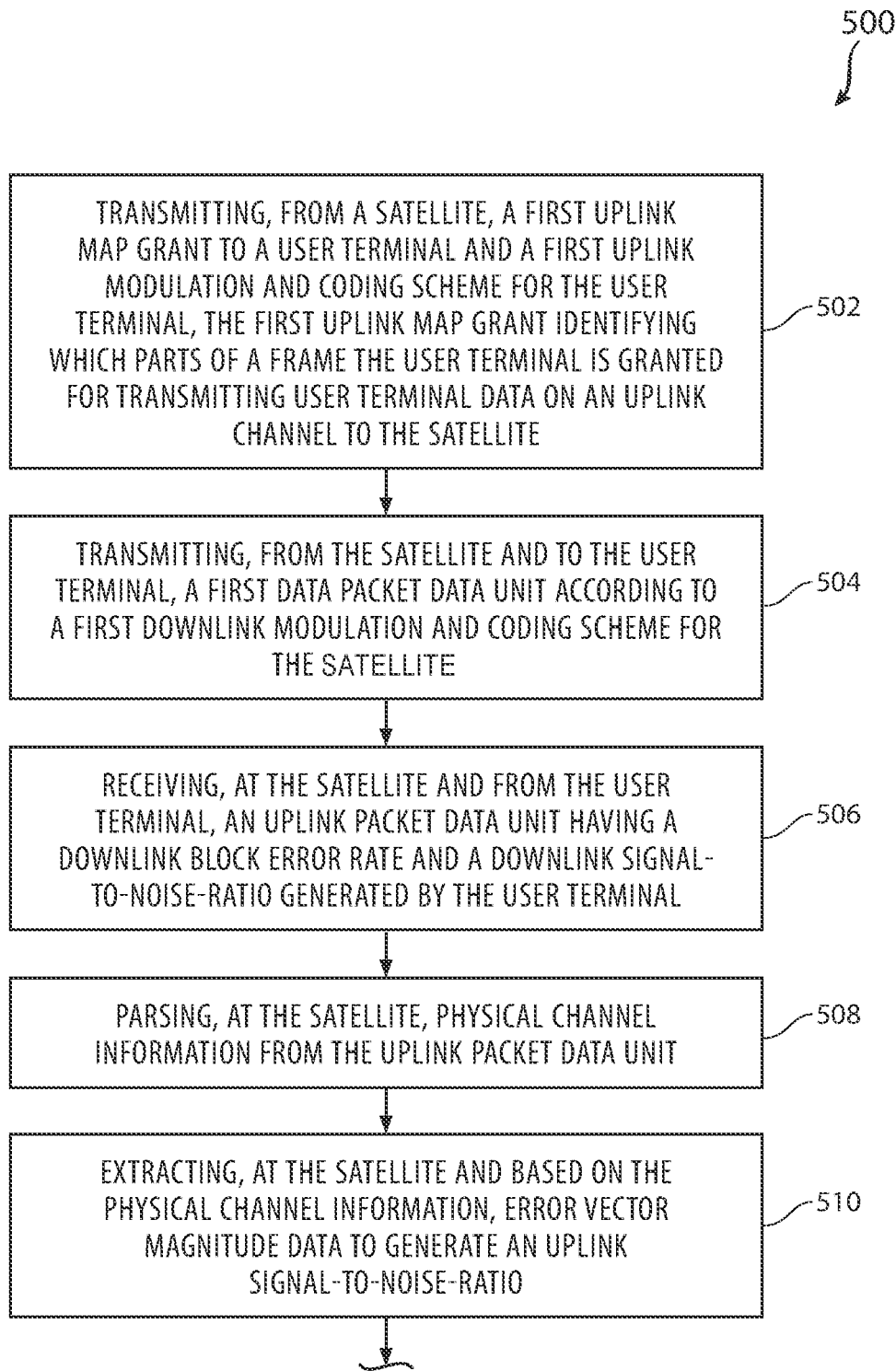
FIG. 5 illustrates a method in accordance with some examples of the present disclosure.
Figure 5:
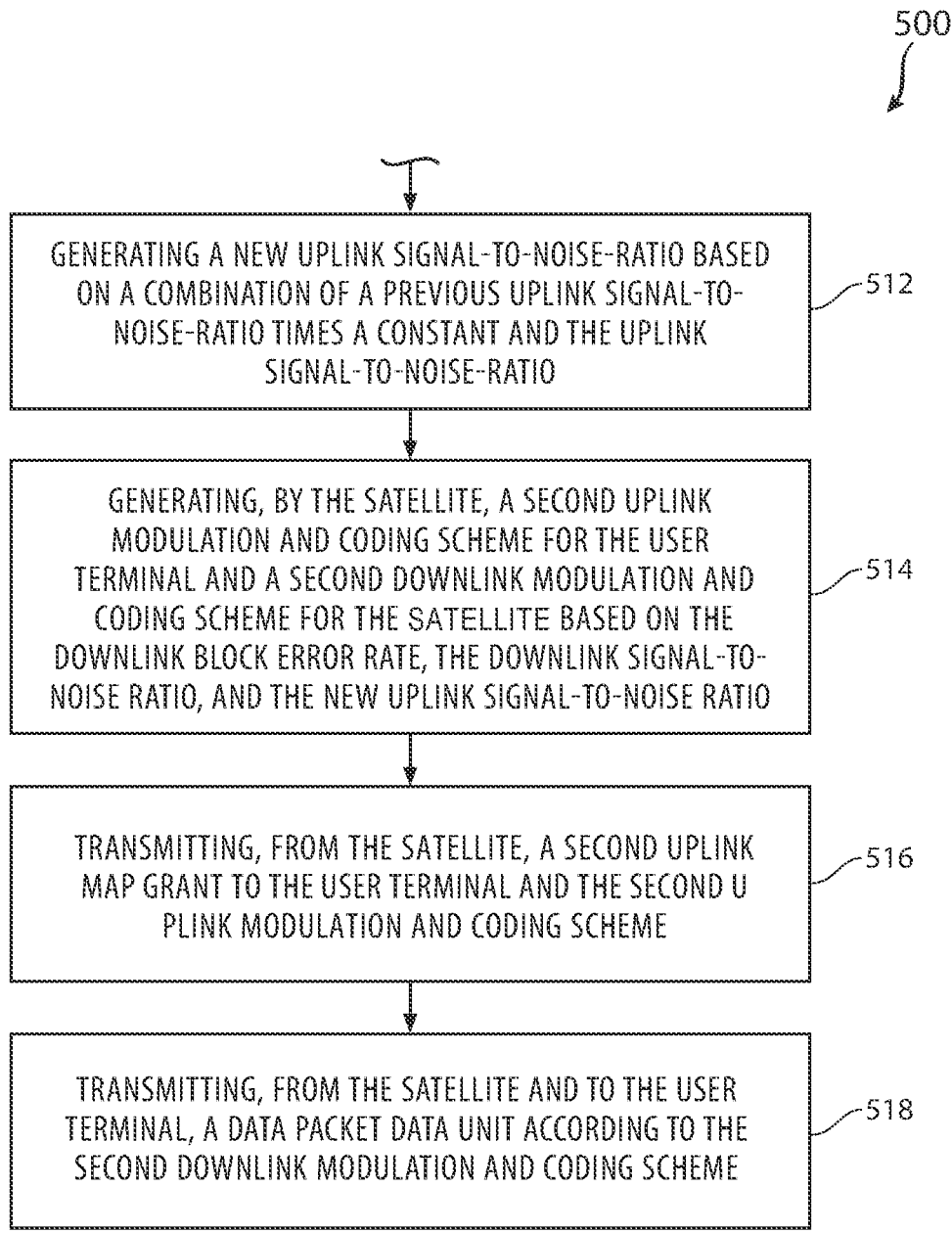
Figure 6:
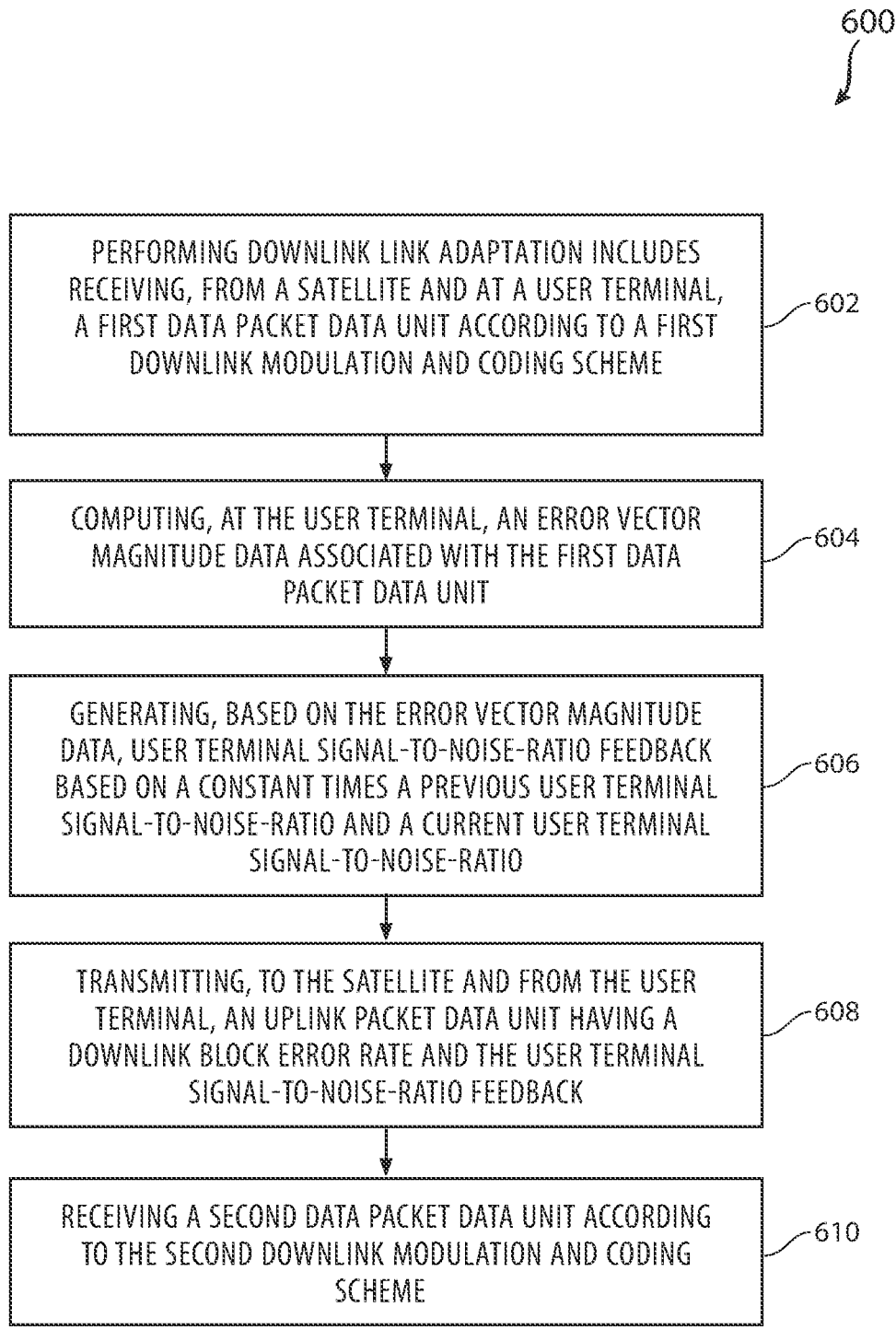
FIG. 6 illustrates a method in accordance with some examples of the present disclosure.
Figure 7:
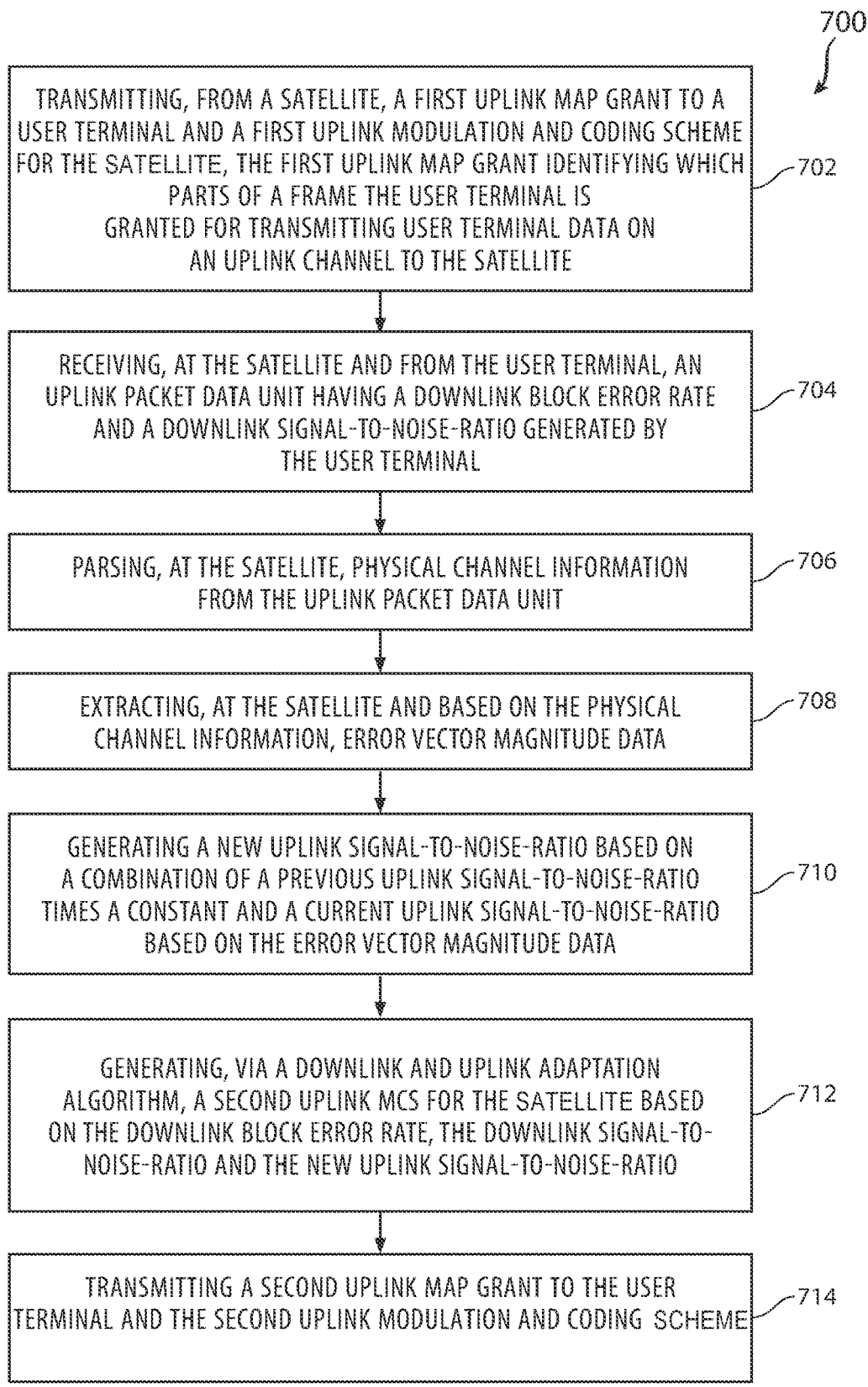
FIG. 7 illustrates another method in accordance with some examples of the present disclosure.
Figure 8:
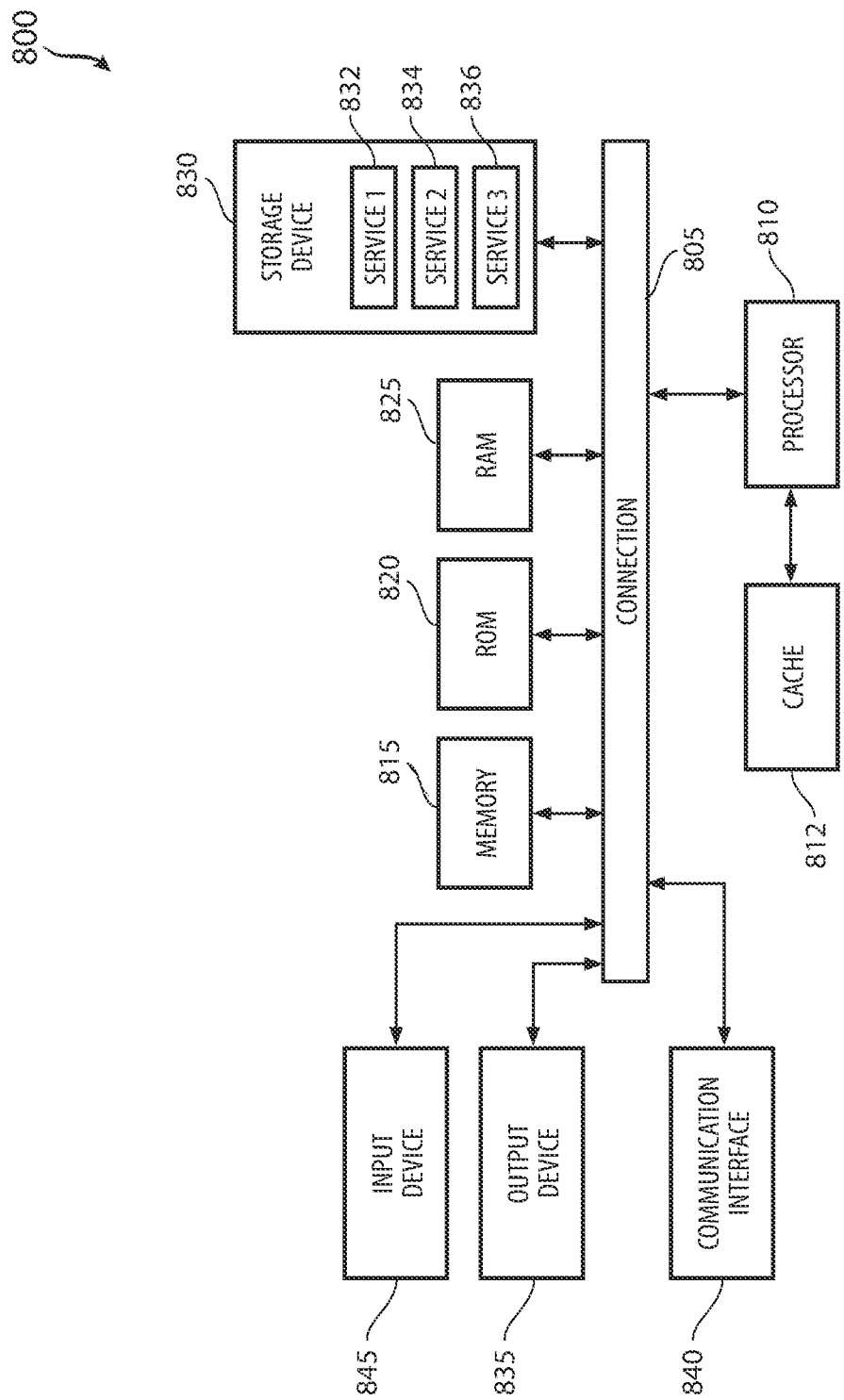
FIG. 8 illustrates an example computing device architecture, in accordance with some examples of the present disclosure.

The present technologies will be described as follows. The discussion begins with a description of example systems and technologies for wireless communications and multi-user communication with a satellite, as illustrated in FIGS. 1 and 2. FIG. 3 illustrates the link adaptation algorithm on a satellite-user-terminal link. FIG. 4 illustrates an example table of the MCS based on a numerical index. FIGS. 5-7 illustrate various method embodiments and FIG. 8 illustrates basic computer components that can be part of any device disclosed herein. The disclosure now turns to FIG. 1.

FIG. 1 is a block diagram illustrating an example wireless communication system 100, in accordance with some examples of the present disclosure. In this example, the wireless communication system 100 includes one or more satellites (SATs) 102A through 102N (collectively "102"), one or more satellite access gateways (SAGs) 104A through 104N (collectively "104"), user terminals (UTs) 112A through 112N (collectively "112"), user network devices 114A through 114N (collectively "114"), and a terrestrial network 120 in communication with the Internet 130. As noted above, this disclosure provides different link adaptation algorithms for satellite-to-user-terminal communications as well as satellite-to-gateway communications.

The SATs 102 can include orbital communications satellites capable of communicating with other wireless devices or networks (e.g., 104, 112, 114, 120, 130) via radio telecommunications signals. The SATs 102 can provide communication channels, such as radio frequency (RF) links (e.g., 106, 108, 116), between the SATs 102 and other wireless devices located at different locations on Earth and/or in orbit. In some examples, the SATs 102 can establish communication channels for Internet, radio, television, telephone, radio, military, and/or other applications.

The user terminals 112 can include any electronic devices and/or physical equipment that support RF communications to and from the SATs 102. Similarly, the SAGs 104 can include gateways or earth stations that support RF communications to and from the SATs 102. The user terminals 112 and the SAGs 104 can include antennas and other RF components for wirelessly communicating with the SATs 102. The user terminals 112 and the SAGs 104 can also include satellite modems for modulating and demodulating radio waves used to communicate with the SATs 102. In some examples, the user terminals 112 and/or the SAGs 104 can include one or more server computers, routers, ground receivers, earth stations, computer equipment, antenna systems, and/or any suitable device or equipment. In some cases, the user terminals 112 and/or the SAGs 104 can perform phased-array beam-forming and digital-processing to support highly directive, steered antenna beams that track the SATs 102. Moreover, the user terminals 112 and/or the SAGs 104 can use one or more frequency bands to communicate with the SATs 102, such as the Ku and/or Ka frequency bands. Other frequency bands could be used as well.

The user terminals 112 can be used to connect the user network devices 114 to the SATs 102 and ultimately the Internet 130. The SAGs 104 can be used to connect the terrestrial network 120 and the Internet 130 to the SATs 102. For example, the SAGs 104 can relay communications from the terrestrial network 120 and/or the Internet 130 to the SATs 102, and communications from the SATs 102 (e.g., communications originating from the user network devices 114, the user terminals 112, or the SATs 102) to the terrestrial network 120 and/or the Internet 130.

The user network devices 114 can include any electronic devices with networking capabilities and/or any combination of electronic devices such as a computer network. For example, the user network devices 114 can include routers, network modems, switches, access points, laptop computers, servers, tablet computers, set-top boxes, Internet-of-Things (IoT) devices, smart wearable devices (e.g., head-mounted displays (HMDs), smart watches, etc.), gaming consoles, smart televisions, media streaming devices, autonomous vehicles, robotic devices, user networks, etc. The terrestrial network 120 can include one or more networks and/or data centers. For example, the terrestrial network 120 can include a public cloud, a private cloud, a hybrid cloud, an enterprise network, a service provider network, an on-premises network, and/or any other network.

In some cases, the SATs 102 can establish RF links 116 between the SATs 102 and the user terminals 112. The RF links 116 can provide communication channels between the SATs 102 and the user terminals 112. In some examples, the user terminals 112 can be interconnected (e.g., via wired and/or wireless connections) with the user network devices 114A. Thus, the RF links 116 between the SATs 102 and the user terminals 112 can enable communications between the user network devices 114A and the SATs 102. In some examples, each SAT 102A through 102N can serve user terminals 112 distributed across one or more cells 110A through 110N (collectively "110"). The cells 110 can represent land areas served and/or covered by the SATs 102. For example, each cell can represent the satellite footprint of radio beams propagated by a SAT. In some cases, a SAT can cover a single cell. In other cases, a SAT can cover multiple cells. In some examples, a plurality of SATs 102 can be in operation simultaneously at any point in time (also referred to as a satellite constellation). Moreover, different SATs can serve different cells and sets of user terminals.

The SATs 102 can also establish RF links 106 with each other to support inter-satellite communications. Moreover, the SATs 102 can establish RF links 108 with the SAGs 104. In some cases, the RF links 116 between the SATs 102 and the user terminals 112 and the RF links between the SATs 102 and the SAGs 104 can allow the SAGs 104 and the user terminals 112 to establish a communication channel between the user network devices 114, the terrestrial network 120 and ultimately the Internet 130. For example, the user terminals 112 can connect the user network devices 114 to the SATs 102 through the RF links 116 between the SATs 102 and the user terminals 112. The SAGs 104 can connect the SATs 102 to the terrestrial network 120, which can connect the SAGs 104 to the Internet 130. Thus, the RF links 108 and 116, the SATs 102, the SAGs 104, the user terminals 112 and the terrestrial network 120 can allow the user network devices 114 to connect to the Internet 130.

In some examples, a user can initiate an Internet connection and/or communication from one of the user network devices 114. The user network device 114 can have a network connection to a user terminal from the user terminals 112, which it can use to establish an uplink (UL)

pathway to the Internet 130. The user terminal 112 can wirelessly communicate with a particular SAT from the SATs 102, and the particular SAT can wirelessly communicate with a particular SAG from the SAGs 104. The particular SAG can be in communication (e.g., wired and/or wireless) with the terrestrial network 120 and, by extension, the Internet 130. Thus, the particular SAG can enable the Internet connection and/or communication from the user network device 114 to the terrestrial network 120 and, by extension, the Internet 130.

In some cases, the particular SAT and SAG can be selected based on signal strength, line of sight, and the like. If a SAG is not immediately available to receive communications from the particular SAT, the particular SAT can be configured to communicate with another SAT. The second SAT can in turn continue the communication pathway to a particular SAG. Once data from the Internet 130 is obtained for the user network device 114, the communication pathway can be reversed using the same or different SAT 102 and/or SAG 104 as used in the UL pathway. The pathways described herein for enabling a user terminal 112 to access the Internet 130 through a SAT and SAG can be chosen based on the adaptation algorithms disclosed herein.

In some examples, the RF links 106, 108, and 116 in the wireless communication system 100 can operate using orthogonal frequency division multiple access (OFDMA) via both time domain and frequency domain multiplexing. OFDM, also known as multicarrier modulation, transmits data over a bank of orthogonal subcarriers harmonically related by the fundamental carrier frequency. An example configuration of an OFDMA radio frame (in which both frequency and time are used to allocated user data in the frame) that can be used for communications in the wireless communication system 100 is shown in FIG. 2 and described below with respect to FIG. 2. Moreover, in some cases, for computational efficiency, fast Fourier transforms (FFT) can be used for modulation and demodulation.

While the wireless communication system 100 is shown to include certain elements and components, one of ordinary skill will appreciate that the wireless communication system 100 can include more or fewer elements and components than those shown in FIG. 1. For example, the wireless communication system 100 can include, in some instances, networks, cellular towers, communication hops or pathways, network equipment, and/or other electronic devices that are not shown in FIG. 1.

FIG. 2 illustrates an example configuration of a multi-user (MU) uplink (UL) radio frame 200. In this example, the radio frame 200 includes an OFDMA signal structure, symbols and characteristics along a time domain 204 and a frequency domain 206. The radio frame 200 includes multiple bursts 202A through 202N, and each burst is allocated to four different user terminals (e.g., UT 1, UT 2, UT 3, UT 4). Each of the user terminals is allocated contiguous radio bursts (RBs) and channel estimation (CE) symbols immediately adjacent to the allocated RBs. The RBs and CE symbols are allocated to the four user terminals 112 along the time domain 204 and the frequency domain 206.

For example, in burst 202A, RBs 210-216 and CE 272 are allocated to UT 1, RB 218 and CE 274 are allocated to UT 2, RBs 220-224 and CE 276 are allocated to UT 3, and RBs 226-228 and CE 278 are allocated to UT 4. In burst 202B, RBs 210-214 and CE 272 are allocated to UT 2, RBs 216-220 and CE 274 are allocated to UT 1, RB 222 and CE 276 are allocated to UT 3, and RBs 224-228 and CE 278 are allocated to UT 4. Finally, in burst 202N, RBs 210-212 and CE 272 are allocated to UT 3, RB 214-218 and CE 274 are allocated to UT 2, RBs 220-224 and CE 276 are allocated to UT 4, and RBs 226-228 and CE 278 are allocated to UT 1. Note that, as shown in FIG. 2, the allocations between user terminals from burst to burst can be flexible, which can allow for allocations from burst to burst to vary or remain the same.

In some cases, the number of RBs between user terminals can vary depending on the payload sizes for the different user terminals. Moreover, in some cases, a burst (e.g., 202A, 202B, 202/V) can include a different total number of RBs than those shown in FIG. 2. In some cases, if fewer than four user terminals are supported in a given burst, at least some RBs and adjacent CE symbol sections can be empty or otherwise denoted as empty or null.

Each of the bursts 202A-202N can include preamble and payload symbols. The preamble portion or block of a burst includes a unique word (UW) symbol 260 and a CE portion including CE symbols 272-278. The UW symbol 260 can be used for burst detection, symbol alignment, carrier frequency offset estimation, etc. The CE symbols 272-278 can provide a preview of channel characteristics for use in channel estimation and equalization. The payload symbols of a burst (also referred to as data symbols) can be located within a payload portion/block of the burst corresponding to the RBs 210-228.

The CE portion/block containing the CE symbols 272-278 of a burst can be located between the unique word portion/block (e.g., the UW symbol 260) and the payload portion/block (e.g., RBs 210-228) along the time domain 204. In other words, in the time domain 204, the unique word symbol 260 occurs first, followed by the CE symbols 272-278, and then followed by the RBs 210-228.

An OFDMA signal allows certain subcarriers to be inactivated, and a configurable number of subcarriers can be disabled in order to avoid the region of spectrum around DC (also referred to as the DC, center, null, or zero subcarrier region) and/or disproportionately higher interference. Accordingly, in some examples, the radio frame 200 can include an unused DC subcarrier 254, which can coincide with the carrier center frequency.

Pilot subcarriers 280 can be used to provide and track amplitude, timing, and phase changes throughout a burst. Each of the bursts 202A-N can have pilot subcarriers 280 defined for the burst. The pilot subcarriers 280 can each be offset from the band edges by a specified number of subcarriers. FIG. 2 shows pilot subcarriers 280 at the edges of the first and last RB allocated to each user terminal. In some examples, the size of the pilot sub-bands and the offset from the band edges can be configurable. In some examples, for wide channel bandwidths, the information provided within pilot subcarriers for a given radio frame can be the same or can differ from each other.

This disclosure now turns to the link adaptation algorithms. The disclosure will introduce a number of different algorithms with variations. For example, some algorithms operate in a satellite-to-user-terminal context (many user terminals communicating with one satellite) while others are designed for satellite-to-gateway contexts (one-to-one communication between a SAT 102 and a SAG 104).

The first algorithms introduced will relate to the satellite-to-user-terminal framework. In one example, a link adaptation algorithm can have a number of prerequisites. When the term "the system" is used, it can apply to any device that is performing the adaptive MCS algorithm, such as the satellite, the user terminal, a gateway, or combination of these devices or other devices. A modulation and coding scheme (MCS) table with an increasing order of signal-to-noise-ratio (SNR) entries can be provided or generated. The table can be generated at the beginning of a communication session or otherwise can be prepared in advance. FIG. 4 illustrates an MCS table with example entries. The order of the entries can change. In one example, the table is in an increasing SNR order. The system can select a given MCS for a given SNR from the table. The table can also be organized in other ways as well, such as based on user priority or other data. In one example, to make the values of the SNR threshold contiguous (which they are not in FIG. 4), the table can be normalized such that the transitions are not disjointed. The way the new MCS table is generated can depend on the preparation of the MCS table shown in FIG. 4 at the beginning of a session.

The system can set an initial MCS value. For example, the initial value could be index 2, which, as is shown in FIG. 4, would define the various parameters for that modulation and coding scheme. A link adaptation interval can be set, for example, to whenever a SNR change event occurs or could be set at a certain value such as 10 radio frames or a bad SNR, or whichever event occurs first. Waiting for a certain amount of frames before making a change to the MCS can help prevent a premature MCS adjustment if the SNR is improving or staying about the same. But, if the SNR quality is dropping fast, then the system can act quickly to change the MCS. The link adaptation algorithm can therefore run when there are a certain number of frames that have been transmitted (such as 10 frames) or when a bad SNR value is received, whichever event is first. This approach can slow the number of times the MCS changes when the SNR is good or only changes in a relatively small way, while enabling a quick MCS change if conditions are fading fast.

A hysteresis value or threshold can also be set. In one example, the link adaptation algorithm can run every link adaptation interval. If the absolute value of a new SNR minus a current SNR is above the hysteresis value or threshold, then a new MCS can be set to the MCS of the new SNR. The hysteresis value can relate to how much of a change exists between one SNR value and another SNR value. For example, if the downlink value for time 1 varies a relatively large amount from the downlink value for time 2, then the hysteresis value can reflect the dramatic change. In another example, the link adaptation algorithm can be only run when the hysteresis value is above a threshold.

In another algorithm example applicable to the satellite-to-user-terminal framework, the link adaptation algorithm can run at every link adaptation interval. If the SNR feedback is consistently better than a current SNR for the link adaptation interval, then the system can compute an average SNR across the link adaptation interval, and the new MCS can be equal to the MCS of the average SNR. Else, if the SNR feedback is worse than the current SNR, then the system can set the new MCS as the MCS of the new SNR. The example table in FIG. 4 can be used for setting the new MCS.

FIG. 3 illustrates a link-adaptation approach 300 for the satellite-to-user-terminal framework. The link adaption approach introduces a new value called BLER, which is block error rate that the user terminal experiences on the downlink according to a given MCS. The goal, in one example, is to keep the block error rate below $10^{-6}$ (See header 418 of FIG. 4).

An example report related to the BLER value can defined as a SNR BLER REPORT having a number of parameters. One example parameter can be "Uint8_t SFID:4", which defines an unsigned integer (which can be, for example, a 32-bit integer) with a value of 4 selected from a potential range of between 0 and 8, inclusive, and can be a service flow identifier. Another parameter can be "Uint16_t SNR: 12", which is also an unsigned integer with a value which describes the signal-to-noise (SNR) ratio. The value can be the actual SNR*100 to make it a percentage value but this is an optional step. Yet another value can be "Uint8_t BLER" which defines the codeword block error rate in a range between 0 and 100, inclusive, and indicates actual BLER percentage. These values and ranges are all exemplary only.

The flow of data shown in FIG. 3 is between the user terminal receives component 302, the user terminal transmit component 304, a satellite receive component 306 and a satellite transmit component 308. The signal flow can include transmissions for both downlink adaptation and uplink adaptation. The downlink adaptation process can also be separately described from the uplink adaptation process. In one example, a calculation of the SNR for the downlink adaptation process occurs on the user terminal. In another example, a calculation of the SNR for the uplink adaptation process occurs on the satellite. However, for all satellite-to-user-terminal link adaptation algorithms, in one example, the satellite runs the link adaptation algorithm to determine the new uplink MCS and the new downlink MCS. The link adaptation algorithm may also run on the user terminal or be split between devices.

For the downlink adaptation process, the satellite uses feedback from the user terminal about the link quality on the downlink. In a first step, the satellite transmission component 308 transmits to a user terminal receives component 302 an uplink map grant with an old or previous uplink MCS for a user terminal 310. The satellite transmission component 308 can transmit a data packet data unit according to an old or previous downlink MCS 312 for the particular user terminal 302. The satellite 308, as the transmitter of data, needs to know or get feedback from the user terminal 302/304 about the quality of the downlink so that the satellite can adjust the downlink MCS accordingly. From the satellite's perspective, it can determine the uplink quality based on its analysis of the data received from the user terminal on the uplink channel. Thus, the satellite receives the downlink SNR and BLER from the user terminal, evaluates the uplink quality it is experiencing, and runs the link adaptation algorithm based on at least some of the data.

As part of the downlink adaptation process, the user terminal receives component 302 (which can be a modem) parses information from the physical layer 1 of the OSI (Open Systems Interconnection) model packet data units to extract error vector magnitude (EVM) data and converts the data to a downlink signal-to-noise-ratio 314. The user terminal receives LMAC (lightweight or lower medium access protocol) component (which can be part of the user terminal receives component 302) parses the physical information and sends SNR information to the transmission LMAC. An LMAC is a "lightweight" MAC protocol used for wireless communications where there are energy use issues such as on a satellite or mobile user terminal. An example calculation, performed by the user terminal, of the SNR can be as follows: SNR=alpha*prev_SNR+(1−alpha)*current SNR. Alpha can represent a constant value. The EVM data can be passed through a PHY (physical) information data field in a header of an OSI layer 1 packet data unit. Grant data and the downlink SNR and downlink block error rate (BLER) data can be communicated 316 to the user terminal transmit component 304. The user terminal transmit LMAC component 304 can transmit an uplink packet data unit having the BLER and SNR information 318 (SNR feedback) to the satellite receive component 306 when an uplink grant is available.

Both the BLER and the SNR feedback are provided because in some cases, the SNR value may be good, but the BLER is actually poor because of interference or other reasons. Accordingly, the algorithms disclosed herein can utilize the SNR data and/or the BLER to update the MCS dynamically according to the link adaptation algorithm. The BLER data can provide good information, independent of SNR, regarding what the receiver 302 is actually seeing on the downlink.

The satellite receive LMAC 306 parses the PHY information from the layer 1 packet data units and extracts the EVM and converts the EVM to an uplink SNR. The calculation on the satellite can be as follows. $SNR = alpha*prev\_SNR+(1-alpha)*current\ SNR$. The alpha term can be a constant. The satellite receive LMAC 306 sends the user terminal SNR feedback and the BLER to the satellite transmit LMAC 322. The satellite transmit LMAC 308 can use the user terminal SNR feedback and/or the BLER to run the link adaptation algorithm 324 for downlink adaptation to generate a new downlink modulation and coding scheme (MCS). There is value in the adaptation algorithm 324 receiving the BLER, the downlink SNR and/or the uplink SNR in order to make a proper MCS decision. Including the BLER can cause a change in the MCS or not separate from the SNR data. For example, if the SNR value is good, but the target BLER of the system is 10% and the actual BLER received is 13%, then the system can adapt the MCS based on the target BLER not meeting a threshold.

The satellite 308 can transmit a second data packet data unit with a new downlink MCS for the satellite-to-user-terminal downlink 328. The satellite transmit LMAC 308 can use the user terminal SNR feedback to run the link adaptation algorithm 324 for uplink adaptation to generate a new uplink MCS transmission 326 to the user terminal 302 with an uplink map grant. The user terminal can then use the new uplink MCS for transmitting data packets on the uplink.

It is noted that the satellite 308 in the example above determines both the uplink MCS and the downlink MCS. For the downlink MCS, the satellite transmits data to the user terminal 328 according to the new downlink MCS. The satellite 308 also transmits instructions 326 for the user terminal for what MCS the user terminal should apply for transmissions on the uplink. Other approaches can include the user terminal 328 determining in whole or in part the uplink MCS and the downlink MCS.

It is noted that the SNR reports are not sent in every frame. The system can average the SNR over a number of frames as shown in the analysis represented by feature 320. The system can take an interval of values and average them to finalize the uplink SNR information which will be used by the link adaptation algorithm 324. In one example, the system can run the adaptation algorithm every X seconds, such as every 20 milliseconds. The timing of this can be set at any value and can also vary based on link channel conditions or other factors. In another example, the user terminal may run a calculation every X milliseconds, and the satellite might run a calculation or the algorithm every Y milliseconds, and the values of X and Y might be the same or might be different.

A scheduling component (not shown) on the satellite 308 will invoke the link adaptation algorithm such that the MCS can be chosen and transmitted to the user terminal 302 with a map grant for the uplink data from the user terminal. The scheduling component, via the grant, allocates the radio resources to the user terminal and other user terminals. The channel quality directly impacts the amount of resources the scheduler needs to allocate for a given user terminal. For example, if the channel quality is good, less radio resources are needed to communicate a certain amount of information. Conversely, if the channel quality is bad, then more radio resources are needed to transmit the same amount of data. Before allocating the radio resources, the scheduling component will call the link adaptation algorithm, provide the SNR information (uplink/downlink SNR, BLER, etc.), receive the new uplink and/or downlink MCS and then use the downlink MCS for communications on the downlink and transmit the uplink MCS to the user terminal so it can transmit on the uplink according to the new MCS.

FIG. 4 illustrates an example table 400 having various rows of data as defined in the header 402 and according to a modulation and coding scheme (MCS) numeric index 404. The values are decided by channel level modeling and performance that would be expected on the channel modeling data for a given SNR for a given frequency. The goal is to determine the proper values to keep the bit error rate below a threshold.

The header 402 includes columns for the numerical index 404, the particular MCS 406, a data rate 408, a number of coded bits 410, a FEC (forward error correction) code rate 412, a coded bits per symbol 414, the number of information bits per symbol 416, the SNR threshold 418, the number of information symbols 420, the number of coded symbols 422 and the coded total number of bits 424. An example SNR or bit error rate threshold is $10^{-6}$. The table could include over 100 rows of data but only a subset of the possible rows is shown. Furthermore, the data shown is exemplary in nature and could be modified with any values.

In another example algorithm applicable to a satellite-to-user-terminals, the algorithm can begin with applying an MCS table with an increasing order of SNR. An initial MCS can be set, for example, at 8. A number of good SNR values at a low watermark can be set at 10 and a number of good SNR values of a high watermark can be set at 50. These are example values and other values could be used as well. Similarly, a number of bad SNR values at a high water mark can be set at 3 and a number of bad SNR values can be set at a low watermark of 1. A target BLER can also be set at 10%. The link adaptation interval can be set at a certain number such as 10 radio frames or if a certain number N of bad SNR frames are received, whichever event occurs first. These are all example values and can change.

Another example algorithm follows. In this example, a current MCS is set as the initial MCS. A number of good SNR values can be set at the number of good SNR values of the low watermark (for example, 10). A number of bad SNR values can be set at the number of bad SNR values with a high watermark (for example, 50). For an initial version, the initial MCS can be hard coded to a conservative low MCS value. Then, going forward, the algorithm can use an approach to determining the initial MCS based on a telemetry or other determinations. The algorithm can run every link adaptation interval as described herein. The algorithm changes the MCS based on link quality feedback (SNR) and/or the target BLER value.

If the SNR feedback is consistently better than the current SNR for the number of good SNR values feedback and BLER is less than the target BLER, then the algorithm can calculate the average SNR as the average of the last number of good SNR values, set a new MCS as the MCS of the average SNR and decrement the number of good SNR values if the number of good SNR values is greater than the number of good SNR values for the low watermark. The algorithm can increment the number of bad SNR values if the number of bad SNR values is less than the number of bad SNR values high watermark.

Otherwise, if there are the number of bad SNR feedbacks that are worse than the current SNR, then the system sets the new MCS as the MCS of the new SNR. The system increments the number of good SNR values if the number of good SNR values is less than the number of good SNR values at the high watermark. The system can decrement the number of bad SNR values if the number of bad SNR values is greater than the number of bad SNR values at the low watermark.

Otherwise, if the BLER is greater than the target BLER value, then the system decrements the current SNR, sets the new MCS as the MCS of the new SNR, increments the number of good SNR values of the number of good SNR values is less than the number of good SNR values high watermark, and decrements the number of bad SNR values of the number of bad SNR values is greater than 1.

Another example link adaptation algorithm can relate to the satellite-to-gateway link. In a gateway to satellite framework, there is a one-to-one mapping between the satellite 102 and the gateway 104. There are not many gateways that communicate with the satellite 102 relative to the number or user terminals 112. The same approach generally applies as outlined above, except for some modifications. Rather than the satellite 102 running the link adaptation algorithm to determine both the uplink MCS and the downlink MCS, the satellite 102 only determines the downlink MCS and the gateway 104 separately determines its uplink MCS. In this case, the gateway 104 can report the downlink SNR (and optionally the BLER) to the satellite 102 just like the user terminal 112 does in the algorithms described above. The satellite 102 then determines, based on the SNR and/or BLER, the downlink MCS. The satellite 102 reports the gateway uplink SNR (and optionally the BLER) to the gateway 104 and the gateway 104 runs the link adaptation algorithm to determine the gateway uplink MCS. Thus, in this scenario, the satellite 102 runs the link adaptation algorithm to determine its downlink MCS and the gateway 104 runs the link adaptation algorithm to determine the uplink MCS. This can occur because there is a point-to-point communication between the satellite 102 and the gateway 104. The system can operate in the Ku frequency band which is 12-18 GHz or the Ka frequency band of 26-40 GHz. Other frequency bands can be used as well and the concepts disclosed herein are not dependent on frequency. There can be a separate table such as the table in FIG. 4 for particular chosen frequency bands.

Another link adaptation algorithm can be applicable for the satellite-to-gateway link. Prerequisites can include an MCS table for a particular frequency band (such as the Ku or Ka band) in increasing order of SNR. An initial value of the MCS can be used and a link adaptation interval can be, for example, 20 milliseconds (about 30 radio frames) or a bad SNR is received, or whichever comes first. In one aspect, the transmission component on either the satellite 102 or the gateway 104 requires feedback from the receive component about link quality. Each receive component (of the gateway and the satellite) computes an average SNR over the link adaptation interval and sends this information to the local Universal MAC (UMAC) component. The local UMAC (on the gateway) sends the information to the remote UMAC (on the satellite) via a UMAC control service data unit (SDU) over the air. The remote UMAC then uses the SNR to run the link adaptation algorithm and pick a new MCS for transmission on the downlink. The new MCS is the MCS of the new SNR drawn from the table in FIG. 4. The BLER can also be sent and used by the adaptation algorithm. Note that the algorithm operates on either the gateway or the satellite depending on which is the transmission device and which is the receive device.

An example SNR report data structure can include parameters such as "Uint8_t SFID:4" which is an unsigned integer having a service flow identifier (chosen from a range of 0 to 8 inclusive) and "Uint16_t SNR:12" which can report an SNR ratio as a percentage.

FIG. 5 illustrates a method 500 example for operating an uplink and downlink link adaptation algorithm. This example is for the satellite-to-user-terminal context. In a first aspect, a method includes transmitting, from a satellite, a first uplink map grant to a user terminal and a first uplink MCS for the user terminal, the first uplink map grant identifying which parts of a frame the user terminal is granted for transmitting user terminal data on an uplink channel to the satellite (502), transmitting, from the satellite and to the user terminal, a first data packet data unit according to a first downlink MCS for the satellite-to-user-terminal downlink (504), and receiving, at the satellite and from the user terminal, an uplink packet data unit having one or more of a downlink block error rate and a downlink signal-to-noise-ratio generated by the user terminal (506).

The method can further include parsing, at the satellite, physical channel information from the uplink packet data unit (508), extracting, at the satellite and based on the physical channel information, error vector magnitude data to generate an uplink signal-to-noise-ratio (510) and generating a new uplink signal-to-noise-ratio based on a combination of a previous uplink signal-to-noise-ratio times a constant and the uplink signal-to-noise-ratio (512). Having generated the new uplink signal-to-noise-ratio, the method can include generating, by the satellite, a second uplink modulation and coding scheme for use for the user-terminal-to-satellite uplink and a second downlink modulation and coding for the satellite-to-user-terminal downlink based on one or more of the downlink block error rate, the downlink signal-to-noise-ratio, and the new uplink signal-to-noise-ratio (514). This aspect provides for both uplink and downlink adaptation.

The method can further include transmitting, from the satellite, a second uplink map grant to the user terminal and the second uplink MCS for the user terminal (516) and transmitting, from the satellite and to the user terminal, a data packet data unit according to the second downlink MCS for the satellite-to-user-terminal downlink (518). The above method is practiced by the satellite or the steps are performed by the satellite but could also be performed in whole or in party by other components in the system.

The user terminal in one aspect generates the downlink signal-to-noise-ratio based on a combination of a current downlink signal-to-noise-ratio and a second constant times a previous downlink signal-to-noise-ratio. Extracting the error vector magnitude data further can include extracting the error vector magnitude data from the uplink packet data unit.

In one aspect, generating a new uplink signal-to-noise-ratio based on a combination of a previous uplink signal-to-noise-ratio times a constant and the uplink signal-to-noise-ratio further can include applying a formula as follows:

SNR (n+1)=alpha*SNR(n)+(1−alpha)*current SNR, wherein alpha is the constant, and the SNR(N+1) can include the new uplink signal-to-noise-ratio, the SNR(n) can include a previous uplink signal-to-noise and the current SNR can include the uplink signal-to-noise-ratio.

The step of transmitting, from the satellite and to the user terminal, the data packet data unit according to the second downlink MCS for the satellite-to-user-terminal downlink can be scheduled by a downlink scheduler that uses the second downlink MCS when scheduling downlink data.

An uplink scheduler can use the second uplink MCS when allocating a grant for the user terminal for transmitting data on the uplink channel.

In another aspect shown in FIG. 6, a method 600 can focus on the downlink adaptation approach for satellite-to-user-terminal communications. In this case, the user terminal generates signal-to-noise feedback to send to the satellite. A method of performing downlink link adaptation includes receiving, from a satellite and at a user terminal, a first data packet data unit according to a first downlink MCS for the satellite-to-user-terminal downlink (602), computing, at the user terminal, an error vector magnitude data associated with the first data packet data unit (604) and generating, based on the error vector magnitude data, user terminal signal-to-noise-ratio feedback based on one or more of a constant times a previous user terminal signal-to-noise-ratio and a current user terminal signal-to-noise-ratio (606). The method can also include transmitting, to the satellite and from the user terminal, an uplink packet data unit having a downlink block error rate and the user terminal signal-to-noise-ratio feedback (608). The satellite can run a link adaptation algorithm based on the user terminal signal-to-noise-ratio feedback and/or the block error rate to generate a second downlink MCS for the satellite-to-user-terminal downlink. The method further includes receiving a second data packet data unit according to the second downlink MCS for the satellite-to-user-terminal downlink (610).

Generating the user terminal signal-to-noise-ratio feedback further can include applying a formula as follows:
SNR=alpha*prev_SNR+(1−alpha)*current SNR, wherein the alpha is the constant, the prev_SNR can include the previous user terminal signal-to-noise-ratio and the current SNR can be the current user terminal signal-to-noise-ratio.

In another aspect shown in FIG. 7, a method 700 can relate to uplink link adaptation in which the satellite performs a new signal-to-noise calculation and the satellite uses feedback from the satellite receive component about the user terminal uplink channel quality. A method of performing uplink link adaptation includes transmitting, from a satellite, a first uplink map grant to a user terminal and a first uplink MCS for the user terminal, the first uplink map grant identifying which parts of a frame the user terminal is granted for transmitting user terminal data on an uplink channel to the satellite (702) and receiving, at the satellite and from the user terminal, an uplink packet data unit having a downlink block error rate and a downlink signal-to-noise-ratio generated by the user terminal (704).

The method can further include parsing, at the satellite, physical channel information from the uplink packet data unit (706), extracting, at the satellite and based on the physical channel information, error vector magnitude data (708) and generating a new uplink signal-to-noise-ratio based on a combination of a previous uplink signal-to-noise-ratio times a constant and a current uplink signal-to-noise-ratio based on the error vector magnitude data (710).

With the generation of the new uplink signal-to-noise-ratio, the method can further include generating, via a downlink and uplink adaptation algorithm, a second uplink MCS for the user terminal based on the downlink block error rate, the downlink signal-to-noise-ratio and the new uplink signal-to-noise-ratio (712). The generating step can be performed on the satellite or on one or more other components in the system. The satellite can then transmit a second uplink map grant to the user terminal and the second uplink MCS for the user terminal (714).

The user terminal can generate the downlink signal-to-noise-ratio based on a combination of a current downlink signal-to-noise-ratio and a second constant times a previous downlink signal-to-noise-ratio. The user terminal can share the frame with at least one other user terminal on the uplink channel.

Generating the new uplink signal-to-noise-ratio based on a combination of the previous uplink signal-to-noise-ratio times the constant and the uplink signal-to-noise-ratio further can include applying a formula as follows:
SNR=alpha*prev_SNR+(1−alpha)*current SNR, wherein the alpha is a constant, the SNR can include the new uplink signal-to-noise-ratio, the prev_SNR can be the previous uplink signal-to-noise-ratio and the current SNR can be the current uplink signal-to-noise-ratio.

The second uplink map grant transmitted to the user terminal with the second uplink MCS can be used by an uplink scheduler on the user terminal when allocating a grant of a portion of a frame for use by the user terminal to transmit data to the satellite. The second uplink map grant can also be transmitted to a second, third and/or fourth user terminal so that each respective user terminal can use the grant to configure or position their data in the same frame for transmission to the satellite. The second uplink MCS can also be transmitted to the other user terminals.

The MCS table decisions described above determines how many modulation symbols are used for a given MCS codeword. For the satellite-to-user-terminal communication, the MCS selection has a direct impact on packing efficiency and the number of users scheduled to transmit data on the uplink. For example, hypothetically assuming the same MCS for all the users, MCS index number 68 can provide for 2048 coded symbols which allows the system to schedule up to 24 users in an uplink radio frame. Each user can get an MCS index 68 codeword. Whereas MCS index number 7 has 8192 coded symbols which allows for up to 6 users in an uplink radio frame. The number of users and radio frame has a direct impact on the antenna and latency. Therefore, the system should avoid choosing MCS 7 in the satellite-to-user-terminal uplink direction.

In one example, the system may choose, for the satellite-to-user-terminal downlink, an MCS value with a block size>=2048 symbols for efficiency purposes. The larger the block size, the better the efficiency. The bandwidth of the uplink is 65.2 MHz, which is low. The user may only get a small part of the bandwidth for their data. The system may choose, for the satellite-to-user-terminal uplink, an MCS value of the block size<2048 symbols for packing efficiency.

In some examples, the methods described above may be performed by one or more computing devices or apparatuses. In one illustrative example, the method can be performed by the system shown in FIG. 1 and/or one or more computing devices with the computing device architecture shown in FIG. 8.

FIG. 8 illustrates example computer device that can be used in connection with any of the systems disclosed herein. In this example, FIG. 8 illustrates a computing system 800 including components in electrical communication with each other using a connection 805, such as a bus. System 800 includes a processing unit (CPU or processor) 810 and a system connection 805 that couples various system components including the system memory 815, such as read only memory (ROM) 820 and random access memory (RAM) 825, to the processor 810. The system 800 can include a cache of high-speed memory connected directly with, in close proximity to, or integrated as part of the processor 810. The system 800 can copy data from the memory 815 and/or the storage device 830 to the cache 812 for quick access by the processor 810. In this way, the cache can provide a performance boost that avoids processor 810 delays while waiting for data. These and other modules can control or be configured to control the processor 810 to perform various actions. Other system memory 815 may be available for use as well. The memory 815 can include multiple different types of memory with different performance characteristics. The processor 810 can include any general purpose processor and a hardware or software service or module, such as service (module) 1 832, service (module) 2 834, and service (module) 3 836 stored in storage device 830, configured to control the processor 810 as well as a special-purpose processor where software instructions are incorporated into the actual processor design. The processor 810 may be a completely self-contained computing system, containing multiple cores or processors, a bus, memory controller, cache, etc. A multi-core processor may be symmetric or asymmetric.

To enable user interaction with the device 800, an input device 845 can represent any number of input mechanisms, such as a microphone for speech, a touch-sensitive screen for gesture or graphical input, keyboard, mouse, motion input, speech and so forth. An output device 835 can also be one or more of a number of output mechanisms known to those of skill in the art. In some instances, multimodal systems can enable a user to provide multiple types of input to communicate with the device 800. The communications interface 840 can generally govern and manage the user input and system output. There is no restriction on operating on any particular hardware arrangement and therefore the basic features here may easily be substituted for improved hardware or firmware arrangements as they are developed.

Storage device 830 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 825, read only memory (ROM) 820, and hybrids thereof.

The storage device 830 can include services or modules 832, 834, 836 for controlling the processor 810. Other hardware or software modules are contemplated. The storage device 830 can be connected to the system connection 805. In one aspect, a hardware module that performs a particular function can include the software component stored in a computer-readable medium in connection with the necessary hardware components, such as the processor 810, connection 805, output device 835, and so forth, to carry out the function.

In some cases, such a computing device or apparatus may include a processor, microprocessor, microcomputer, or other component of a device that is configured to carry out the steps of the methods disclosed above. In some examples, such computing device or apparatus may include one or more antennas for sending and receiving RF signals. In some examples, such computing device or apparatus may include an antenna and a modem for sending, receiving, modulating, and demodulating RF signals, as previously described.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein. The computing device may further include a display (as an example of the output device or in addition to the output device), a network interface configured to communicate and/or receive the data, any combination thereof, and/or other component(s). The network interface may be configured to communicate and/or receive Internet Protocol (IP) based data or other type of data.

The methods discussed above are illustrated as a logical flow diagram, the operations of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the methods disclosed herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

What is claimed is:

1. A method comprising:
   transmitting, from a satellite and to a user terminal, a first uplink map grant and a first uplink modulation and coding scheme for the user terminal;
   transmitting, from the satellite and to the user terminal, a data packet data unit;
   receiving, at the satellite and from the user terminal, an uplink packet data unit having downlink data comprising one or more of a downlink block error rate and a downlink signal-to-noise-ratio;
   generating an uplink signal-to-noise-ratio based on a previous uplink signal-to-noise-ratio; and
   generating, by the satellite, a second uplink modulation and coding scheme for the user terminal and a downlink modulation and coding scheme for a satellite-to-user-terminal downlink based on one or more of the downlink data and the uplink signal-to-noise-ratio.

2. The method of claim 1, wherein the downlink signal-to-noise-ratio is generated based on a combination of a current downlink signal-to-noise-ratio and a weighting coefficient times a previous downlink signal-to-noise-ratio.

3. The method of claim 1, further comprising:
   transmitting, from the satellite, a second uplink map grant to the user terminal and the second uplink modulation and coding scheme for the user terminal; and
   transmitting, from the satellite and to the user terminal, a second data packet data unit according to the downlink modulation and coding scheme for the satellite-to-user-terminal downlink.

4. The method of claim 3, wherein transmitting, from the satellite and to the user terminal, the second data packet data unit is performed according to the downlink modulation and coding scheme for the satellite-to-user-terminal downlink.

5. The method of claim 4, wherein satellite downlink data from the satellite to the user terminal is scheduled by a downlink scheduler that uses the downlink modulation and coding scheme when scheduling the satellite downlink data.

6. The method of claim 1, further comprising:
   extracting, at the satellite and based on physical channel information, error vector magnitude data to generate the uplink signal-to-noise-ratio, wherein extracting the error vector magnitude data further comprises extracting the error vector magnitude data from the uplink packet data unit.

7. The method of claim 1, wherein generating the uplink signal-to-noise-ratio further comprises applying a formula:
   $SNR(n+1) = alpha*SNR(n)+(1-alpha)*current\_SNR$,
   wherein alpha is a weighting coefficient, and SNR(N+1) comprises the uplink signal-to-noise-ratio, SNR(n) comprises a previous uplink signal-to-noise and current_SNR comprises the uplink signal-to-noise-ratio.

8. The method of claim 1, wherein an uplink scheduler on the satellite uses the second uplink modulation and coding scheme when allocating a grant for the user terminal for transmitting data on an uplink channel.

9. A system comprising:
   a processor; and
   a computer-readable storage device storing instructions which, when executed by the processor, cause the processor to:
      transmit, to a user terminal, a first uplink map grant and a first uplink modulation and coding scheme for the user terminal;
      transmit, to the user terminal, a data packet data unit;
      receive, from the user terminal, an uplink packet data unit having downlink data comprising one or more of a downlink block error rate and a downlink signal-to-noise-ratio;
      generate an uplink signal-to-noise-ratio based on a previous uplink signal-to-noise-ratio; and
      generate a second uplink modulation and coding scheme for the user terminal and a downlink modulation and coding scheme for a system-to-user-terminal downlink based on one or more of the downlink data and the uplink signal-to-noise-ratio.

10. The system of claim 9, wherein the downlink signal-to-noise-ratio is generated based on a combination of a current downlink signal-to-noise-ratio and a weighting coefficient times a previous downlink signal-to-noise-ratio.

11. The system of claim 9, wherein the computer-readable storage device stores additional instructions which, when executed by the processor, cause the processor to:
    transmit a second uplink map grant to the user terminal and the second uplink modulation and coding scheme for the user terminal; and
    transmit, to the user terminal, a second data packet data unit according to the downlink modulation and coding scheme for the system-to-user-terminal downlink.

12. The system of claim 11, wherein the computer-readable storage device stores additional instructions which, when executed by the processor, cause the processor to transmit, to the user terminal, the second data packet data unit according to the downlink modulation and coding scheme for the system-to-user-terminal downlink.

13. The system of claim 12, wherein satellite downlink data from the system to the user terminal is scheduled by a downlink scheduler that uses the downlink modulation and coding scheme when scheduling the satellite downlink data.

14. The system of claim 9, wherein the computer-readable storage device stores additional instructions which, when executed by the processor, cause the processor to:
    extract, based on physical channel information, error vector magnitude data to generate the uplink signal-to-noise-ratio, wherein extracting the error vector magnitude data further comprises extracting the error vector magnitude data from the uplink packet data unit.

15. The system of claim 9, wherein the computer-readable storage device stores additional instructions which, when executed by the processor, cause the processor to generate the uplink signal-to-noise-ratio by applying a formula:
    $SNR(n+1) = alpha*SNR(n)+(1-alpha)*current\_SNR$,
    wherein alpha is a weighting coefficient, and SNR(N+1) comprises the uplink signal-to-noise-ratio, SNR(n) comprises a previous uplink signal-to-noise and current_SNR comprises the uplink signal-to-noise-ratio.

16. The system of claim 9, wherein an uplink scheduler on the system uses the second uplink modulation and coding scheme when allocating a grant for the user terminal for transmitting data on an uplink channel.

17. A system comprising:
    a processor; and
    a computer-readable storage device storing instructions which, when executed by the processor, cause the processor to:
       receive, from a satellite, a data packet data unit according to a first downlink modulation and coding scheme for a satellite-to-user-terminal downlink;
       compute an error vector magnitude data associated with the data packet data unit;
       generate, based on the error vector magnitude data, user terminal signal-to-noise-ratio feedback based on one or more of a weighting coefficient times a previous user terminal signal-to-noise-ratio and a current user terminal signal-to-noise-ratio;

transmit, to the satellite, an uplink packet data unit having a downlink block error rate and the user terminal signal-to-noise-ratio feedback, wherein the satellite generates a second downlink modulation and coding scheme for the satellite-to-user-terminal downlink based on the user terminal signal-to-noise-ratio feedback; and receive a second data packet data unit according to the second downlink modulation and coding scheme for the satellite-to-user-terminal downlink.

18. The system of claim 17, wherein the computer-readable storage device stores additional instructions which, when executed by the processor, cause the processor to extract the error vector magnitude data by extracting the error vector magnitude data from the data packet data unit.

19. The system of claim 17, wherein the computer-readable storage device stores additional instructions which, when executed by the processor, cause the processor to generate an uplink signal-to-noise-ratio by applying a formula:

SNR=alpha*prev_SNR+(1−alpha)*current_SNR, wherein alpha is the weighting coefficient, and prev_SNR comprises a previous user terminal signal-to-noise-ratio and current_SNR comprises the current user terminal signal-to-noise-ratio.

20. The system of claim 17, wherein the computer-readable storage device stores additional instructions which, when executed by the processor, cause the processor to:

receive a grant from the satellite; and position user data in a frame based on the grant, wherein an uplink scheduler on the satellite uses an uplink modulation and coding scheme when allocating the grant for the system for transmitting data on an uplink channel.

* * * * *